(12) United States Patent
Glassner

(10) Patent No.: US 6,949,044 B2
(45) Date of Patent: *Sep. 27, 2005

(54) POWER DIVIDER FOR MOTOR VEHICLES COMPRISING AN OFF-ROAD SPEED GEAR

(75) Inventor: Rudolf Glassner, Kottes (AT)

(73) Assignee: Steyr-Daimler-Puch Fahrzeugtechnik AG&Co. KG, Graz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 10/333,149

(22) PCT Filed: Jul. 19, 2001

(86) PCT No.: PCT/AT01/00249
§ 371 (c)(1),
(2), (4) Date: Aug. 18, 2003

(87) PCT Pub. No.: WO02/08006
PCT Pub. Date: Jan. 31, 2002

(65) Prior Publication Data
US 2004/0023741 A1 Feb. 5, 2004

(30) Foreign Application Priority Data
Jul. 19, 2000 (AT) .................................. GM527/2000

(51) Int. Cl.[7] ............................................. F16H 37/02
(52) U.S. Cl. ..................... 475/213; 475/211; 475/219; 475/338; 475/339; 180/247; 180/248
(58) Field of Search ................... 475/213, 211, 475/219, 338; 180/247, 248

(56) References Cited

U.S. PATENT DOCUMENTS

| 3,837,237 A | * | 9/1974 | Rossler et al. ............. 475/219 |
| 4,344,335 A | * | 8/1982 | Kawai ....................... 475/223 |
| 4,677,873 A | * | 7/1987 | Eastman et al. ............ 475/204 |
| 4,721,194 A | * | 1/1988 | Frost ....................... 192/48.91 |
| 4,804,061 A | * | 2/1989 | Kameda ..................... 180/247 |
| 5,295,919 A | * | 3/1994 | Kobayashi .................. 475/205 |
| 5,702,321 A | * | 12/1997 | Bakowski et al. .......... 475/199 |
| 6,056,666 A | * | 5/2000 | Williams .................... 475/320 |
| 6,283,890 B1 | * | 9/2001 | Schleuder et al. .......... 475/343 |
| 6,840,880 B2 | * | 1/2005 | Glassner ..................... 475/198 |
| 2004/0014546 A1 | * | 1/2004 | Glassner ..................... 475/198 |

FOREIGN PATENT DOCUMENTS

| EP | 882912 A2 | * | 12/1998 | ........... F16H/61/28 |
| EP | 924118 A2 | * | 6/1999 | ......... B60K/17/346 |

* cited by examiner

Primary Examiner—Rodney H. Bonck
Assistant Examiner—David D. Le
(74) Attorney, Agent, or Firm—Bachman & LaPointe, P.C.

(57) ABSTRACT

A transfer case for motor vehicles with off-the-road gear comprises a casing, an input shaft, a first output shaft, coaxial with the latter, a second output shaft, offset therefrom, a speed-reduction unit, a coupling unit and an offset drive. The speed-reduction unit comprises a central drive gearwheel, connected in a rotationally fixed manner to the input shaft, a central driven gearwheel and at least two intermediate transmissions, rotatable about spindles fixed to the casing, each with two intermediate gearwheels, one of which meshes with the central drive gearwheel and the other meshes with the central driven gearwheel, a first driven shaft, connected in a rotationally fixed manner to the central drive gearwheel, and a hollow second driven shaft, connected in a rotationally fixed manner to the central driven gearwheel, which driven shafts lead to a coupling unit.

7 Claims, 2 Drawing Sheets

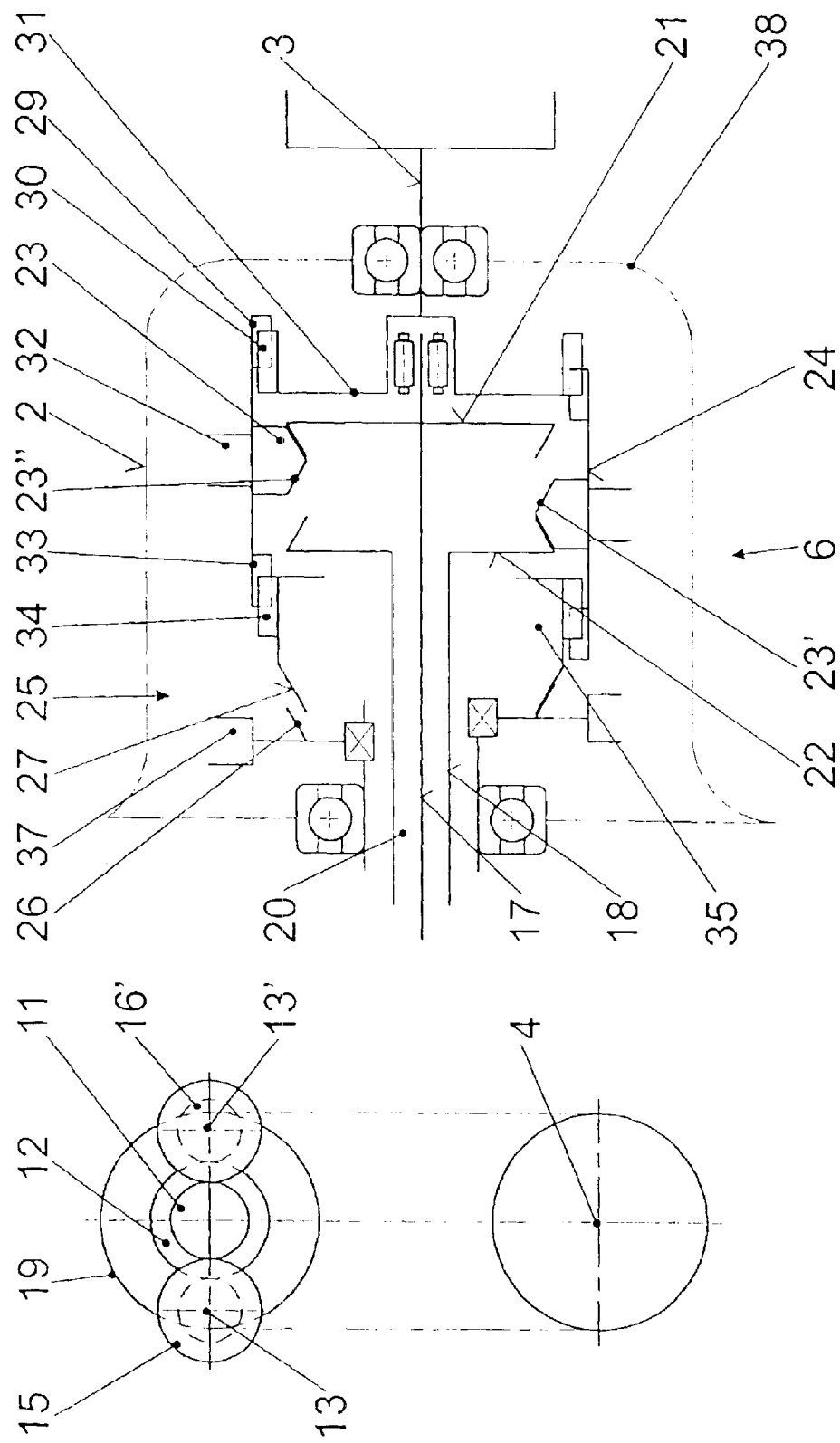

POWER DIVIDER FOR MOTOR VEHICLES COMPRISING AN OFF-ROAD SPEED GEAR

BACKGROUND OF THE INVENTION

The invention concerns a transfer case for motor vehicles with off-the-road gear, comprising a casing, an input shaft, a first output shaft, coaxial with the latter, a second output shaft, offset therefrom, a speed-reduction unit, a coupling unit and an offset drive. This form of transfer case is also referred to as "single-offset". It is used in particular for fourwheel-drive passenger motor vehicles and light commercial vehicles with longitudinal engine-transmission assembly, it being possible to change over from the on-the-road gear into an off-the-road gear by means of the speed-reduction unit, often dispensing with an interaxle differential and it being possible to cut in the drive of the second driven axle.

A transfer case of the generic type is known from EP 882 912 A2. In this transfer case, the speed-reduction unit is, on the side of the input shaft, a planetary transmission with an internal-geared wheel fixed to the casing and an output on the planet carrier. Right behind it is the associated shifting device. This is then followed by the driving wheel of the offset drive and, finally, a coupling for the cutting-in of the second driven axle.

This arrangement has various disadvantages. Because of the internal-geared wheel fixed to the casing, the planetary transmission also continues to run in meshing engagement in the on-the-road gear, which increases the noise generated and the amount of wear; moreover, when designing planetary transmissions of this type, planetary wheels that are unfavorably small for the reduction ratios customary for an off-the-road gear are obtained. Furthermore, internal-geared wheels are relatively expensive to produce. The shifting device between the planetary transmission and the driving wheel of the offset drive increases the overall length and displaces the offset drive to the rear, both being unfavorable for various reasons including the emission of structure-borne sound through the casing.

It is therefore the object of the invention to overcome the drawbacks mentioned of a transfer case of the generic type. It is intended to run quietly and with little wear, be as small and inexpensive as possible, and the second output shaft is to be as far forward as possible.

SUMMARY OF THE INVENTION

According to the invention, the foregoing object is achieved by the speed-reduction unit comprising: a central drive gearwheel, connected in a rotationally fixed manner to the input shaft, a likewise central driven gearwheel and at least two intermediate transmissions, rotatable about spindles fixed to the casing, each with two intermediate gearwheels, one of which meshes with the central drive gearwheel and the other meshes with the central driven gearwheel, a first driven shaft, connected in a rotationally fixed manner to the central drive gearwheel, and a tubular second driven shaft, connected in a rotationally fixed manner to the central driven gearwheel, both of which driven shafts lead to the coupling unit which is coaxial with the output shaft.

A speed-reduction unit designed in such a way ensures in the on-the-road gear that the drive is passed directly through with idling intermediate transmission gearwheels; in the off-the-road gear, optimum speed-reduction ratios (approximately 2.5:1) can be easily realized. Comparison of the speed-reduction unit, which can also be conceived as a planetary transmission without an internal-geared wheel and with a stationary planet carrier, with the planetary transmission according to the prior art shows that the overall length is significantly shorter because of the omission of the side pieces of a planet carrier. The space requirement is also significantly reduced in a plane transverse to the axis by the omission of the internal-geared wheel. It is further reduced if the two intermediate transmissions—opposite each other—lie for instance in a horizontal plane. This allows transmissions also to be made with only little offset between the input shaft and the second output shaft, and also with lateral offset.

Furthermore, the two coaxial driven shafts, one of which is a hollow shaft, allow the coupling unit to be arranged away from the speed-reduction unit. This allows the offset drive to be arranged between the speed-reduction unit and the coupling unit, viewed in the longitudinal direction, its driving wheel being mounted rotatably with a second hollow shaft. The arrangement of the coupling unit away from the speed-reduction unit provides a particularly short and rigid transmission casing and the second output shaft ends very far forward. Furthermore, the diameter of the coupling unit is not restricted by this, so that great torques can be transferred and synchronized.

In a preferred embodiment, the coupling has a first primary part and a second primary part and an axially displaceable secondary part arranged in between, the first primary part being connected in a rotationally fixed manner to the first driven shaft and the second primary part being connected in the same way to the second driven shaft, and the secondary part forming a shift sleeve, which is connected in a rotationally fixed but axially displaceable manner to the first output shaft. The secondary part is arranged between the two primary parts and can be brought from a neutral position into engagement with one or the other for selecting between the off-the-road gear and the on-the-road gear. In both gears, the fitted-over shift sleeve forms the connection with the first output shaft.

In a development of the invention, the shift sleeve of the secondary part can be connected by means of a cut-in coupling to the driving wheel of the offset drive. The secondary part of one coupling is consequently the driving part of the cut-in coupling, which has the result that the coupling unit also has few components and a short overall length. The cut-in coupling preferably comprises a first coupling part, which is connected in a rotationally fixed but displaceable manner to the driving wheel of the offset drive, and a second coupling part, which is connected in a rotationally fixed manner to the shift sleeve. Consequently, the shifting of the off-the-road gear is not impaired by the cutting-in operation. The two couplings can be shifted independently of each other.

There are various possibilities within the scope of the invention for the design of the couplings. They may be configured with positive engagement as simple dog or sleeve clutches, or the coupling parts have synchronizing devices. In this case, the arrangement of the coupling unit downstream of the transfer case proves to be particularly advantageous, because the diameter of the coupling parts is not restricted and a large diameter is available for the synchronization. This is important because, with the great step change between the on-the-road gear and the off-the-road gear, the synchronization has to meet demanding requirements.

A further advantage of the arrangement of the coupling unit downstream of the transfer case can be obtained if the latter is accommodated by a separate coupling casing flange-mounted on the rear side of the casing. The casing of the transfer case is then even shorter and assembly, accessibility and sound emission characteristics are improved.

BRIEF DESCRIPTION OF THE DRAWINGS

The invention is described and explained below on the basis of figures of a preferred exemplary embodiment, in which:

FIG. 2 shows a schematic section according to 2—2 in FIG. 1; and

FIG. 3 shows an enlarged detail 3 from FIG. 1.

DETAILED DESCRIPTION

Figure 1:
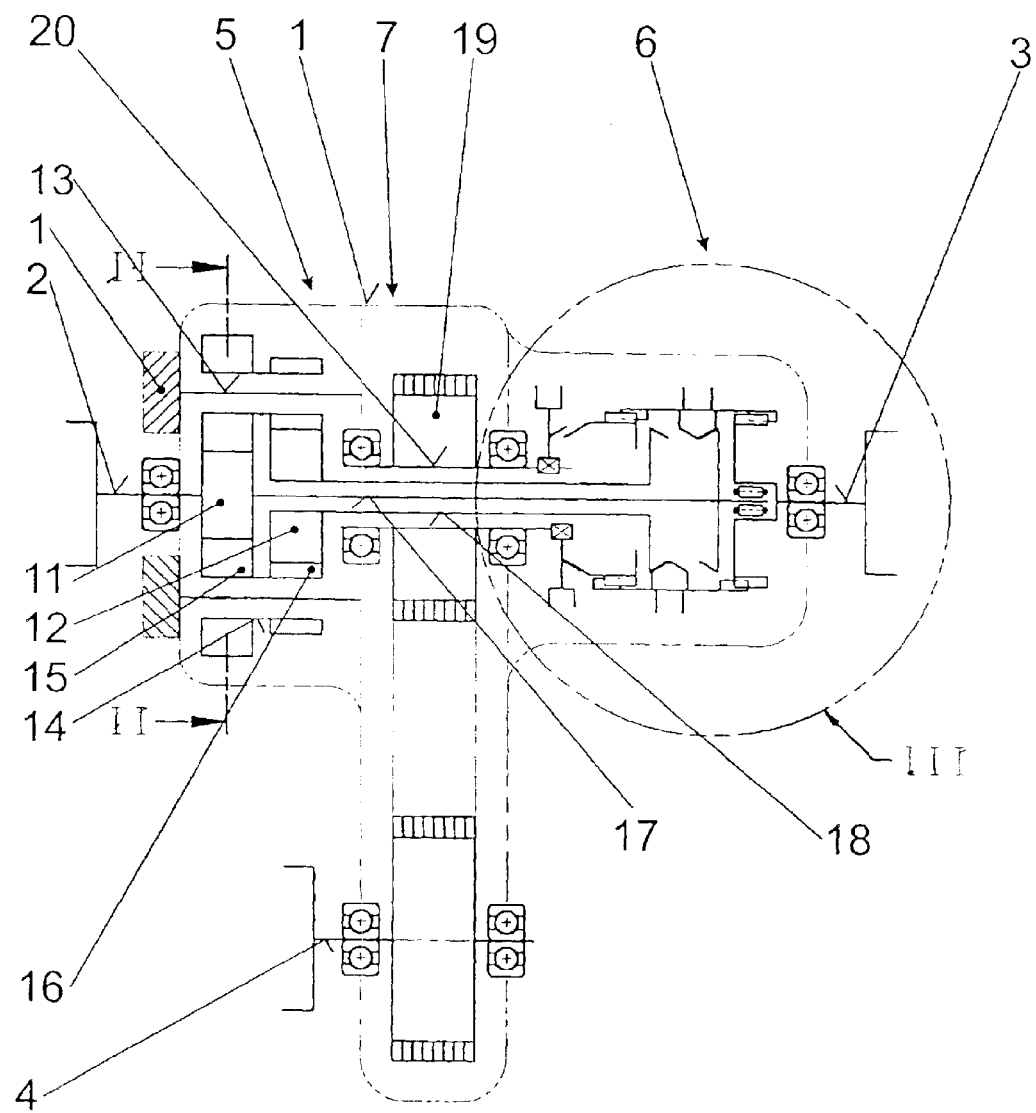
FIG. 1 shows a longitudinal section.

In FIG. 1, the casing of a transfer case is only indicated and is designated by 1. The transfer case is in connection with an engine-transmission unit (not represented) via an input shaft 2, with an axle, preferably the rear axle of a fourwheel-drive motor vehicle, via a first output shaft 3, which is coaxial with the input shaft 2, and with a second driven axle, preferably the front axle, via a second output shaft 4. Accommodated in the casing 1 are all the subassemblies of the transfer case, a speed-reduction unit 5, a coupling unit 6 and an offset drive 7 for driving the second output shaft 4, which is offset with respect to the first output shaft 3.

The speed-reduction unit 5 comprises a central drive gearwheel 1, connected in a rotationally fixed manner to the input shaft 2, a central driven gearwheel 12 and two intermediate transmissions 14, mounted on spindles 13 fixed to the casing. A greater or smaller number of intermediate transmissions may be chosen. In the case of two intermediate transmissions, the bearings of the central driven gearwheel are relieved of radial forces, in the case of 3 intermediate transmissions the central driven gearwheel 12 is centered. The intermediate transmission 14 has a first intermediate gearwheel 15 and a second intermediate gearwheel 16, which are connected in a rotationally fixed manner to each other or are in one piece. The central drive gearwheel 11 is adjoined by a first driven shaft 17, the central driven gearwheel 12 is adjoined by a second driven shaft 18, which is a hollow shaft surrounding the first driven shaft. These optionally drive via the coupling unit 6 a driving wheel 19 of the offset drive 7, mounted with a second hollow shaft 20, and the first output shaft 3. The driving wheel 19 is preferably connected in a rotationally fixed manner to the second hollow shaft 20, which is mounted in the casing 1. The driving wheel 19 is either a gearwheel or a correspondingly shaped wheel of a flexible transmission to the offset second output shaft 4.

FIG. 2 shows the gearwheels of the speed-reduction unit 5, although, as a modification of FIG. 1, the two spindles 13, 13' that are fixed to the casing are not arranged above and below the central drive wheel 11 but to the right and left of it. This arrangement is advantageous if the offset between the two output shafts 3,4 is to be smaller.

In FIG. 3, the coupling 6 is already shown in its synchronized embodiment, but it can similarly be configured with unsynchronized couplings. The coupling unit 6 substantially comprises: a first primary part 21, connected in a rotationally fixed manner to the first driven shaft 17, a second primary part 22, connected in a rotationally fixed manner to the second driven shaft 18, a secondary part 23, connected in a rotationally fixed manner to the first output shaft 3, and a shift sleeve 24. Also provided is a cut-in coupling 25, the first coupling part 26 of which is connected in a rotationally fixed manner to the second hollow shaft 20 and the second coupling part 27 of which is connected in such a way to the first output shaft 3, with the shift sleeve 24 interposed.

In the embodiment shown, the secondary part 23 is firmly connected to the shift sleeve 24. Here it has conical contact surfaces 23', 23". In the on-the-road gear, the contact surface 23' bears against contact surfaces of the first primary part 21 (upper half of the figure). In the off-the-road gear, the second contact surface 23' bears against the second primary part 22 (lower half of the figure). The contact surfaces 23', 23" and the associated primary parts 21, 22 are designed as synchronous couplings. These are not described in any more detail, because all conceivable types of synchronous couplings can be used. The shift sleeve 24 is connected on one side via a first coupling tooth system 29, 30 to a driven hub 31, which is part of the first output shaft 3. On the other side, the shift sleeve 24 is supported via a second coupling tooth system 33, 34 on a hub 35, which may be mounted rotatably in the casing or on the second driven shaft 18. In this way, the shift sleeve 24 is centered on both sides and displaceable in the axial direction by means of a shift fork (not represented), which engages in an annular groove 32.

The hub 35 interacts with the cut-in coupling 25. This is because it is designed as a second coupling part 27, which interacts with the first coupling part 26 when the front-wheel drive is cut in. For this purpose, the first coupling part 26 is connected in a rotationally fixed but axially displaceable manner to the second hollow shaft 20 by means of a toothed shaft connection 36. For cutting in the front-wheel drive, the first coupling part 26 is pushed to the right by a shift fork (not represented), engaging in a groove 37, until it comes into engagement with the second coupling part 27. Here, too, a synchronization which is not represented in any more detail is provided. The entire coupling unit 6 is accommodated in a coupling casing 38, which is flange-mounted onto the casing 1 of the transfer case.

What is claimed is:

1. A transfer case for motor vehicles with off-the-road gear, comprising a casing (1), an input shaft (2), a first output shaft (3), coaxial with the input shaft (2), a second output shaft (4), offset therefrom, a speed-reduction unit (5), a coupling unit (6) and an offset drive (7), wherein the speed-reduction unit (5) comprises a central drive gearwheel (11), connected in a rotationally fixed manner to the input shaft, a central driven gearwheel (12) and at least two intermediate transmissions (14), rotatable about spindles (13) fixed to the casing, each of the intermediate transmissions (14) have two intermediate gearwheels (15, 16), one of which (15) meshes with the central drive gearwheel (11) and the other (16) meshes with the central driven gearwheel (12), a first driven shaft (17), connected in a rotationally fixed manner to the central drive gearwheel (11), and a hollow second driven shaft (18), connected in a rotationally fixed manner to the central driven gearwheel (12), and both driven shafts (17, 18) lead to the coupling unit (6) which is coaxial with the first output shaft (3).

2. The transfer case as claimed in claim 1, wherein the coupling unit (7) is accommodated by a coupling casing (28) flange-mounted on the rear side of the casing (1).

3. The transfer case as claimed in claim 1, wherein the offset drive (7) is arranged between the speed-reduction unit (5) and the coupling unit (6), viewed in the longitudinal direction, and its driving wheel (19) is mounted rotatably with a second hollow shaft (20).

4. The transfer case as claimed in claim 1 or 3, wherein the coupling unit has a first primary part (21) and a second primary part (22) and an axially displaceable secondary part (23) arranged in between, the first primary part (21) being connected in a rotationally fixed manner to the first driven shaft (17) and the second primary part (22) being connected in the same way to the second driven shaft (18), and the secondary part (23) being firmly connected to a shift sleeve (24), which is connected in a rotationally fixed and axially displaceable manner to the first output shaft (3).

5. The transfer case as claimed in claim 4, wherein the shift sleeve (24) of the secondary part (23) can be connected by means of a cut-in coupling (25) to the driving wheel (19) of the offset drive (7).

6. The transfer case as claimed in claim 5, wherein the cut-in coupling (25) comprises a first coupling part (26), which is connected in a rotationally fixed but displaceable manner to the driving wheel (19) of the offset drive (7), and a second coupling part (27), which is connected in a rotationally fixed manner to the shift sleeve (24).

7. The transfer case as claimed in claim 5, wherein one or the other of the coupling parts (21, 22, 23, 26, 27) has synchronizing devices.

* * * * *